United States Patent [19]

Recker et al.

[11] Patent Number: 5,532,296

[45] Date of Patent: Jul. 2, 1996

[54] BISMALEIMIDE RESIN SYSTEMS TOUGHENED BY ADDITION OF PREFORMED FUNCTIONALIZED LOW $T_G$ ELASTOMER PARTICLES

[75] Inventors: Hans G. Recker, Irvine, Calif.; Helmut Tesch, Roedersheim/Gronau, Germany; Thomas Weber, Ludwigshafen, Germany; Volker Altstaedt, Gernsheim, Germany; Jack D. Boyd, Westminster, Calif.

[73] Assignee: Cytec Technology Corp., Wilmington, Del.

[21] Appl. No.: 126,012

[22] Filed: Sep. 24, 1993

Related U.S. Application Data

[63] Continuation of Ser. No. 756,001, Sep. 6, 1991, abandoned, which is a continuation-in-part of Ser. No. 738,006, Jul. 30, 1991, abandoned.

[51] Int. Cl.⁶ .............................. C08G 73/10; C08J 5/24
[52] U.S. Cl. .......................... 523/400; 523/149; 523/156; 523/158; 523/434; 523/436
[58] Field of Search ...................... 523/400, 434, 523/436, 149, 156, 158

[56] References Cited

U.S. PATENT DOCUMENTS

| | | | |
|---|---|---|---|
| 4,644,039 | 2/1987 | Boyd et al. | 525/422 |
| 4,654,405 | 3/1987 | Jalbert et al. | 525/391 |
| 4,656,208 | 4/1987 | Chu et al. | 523/400 |
| 4,740,552 | 4/1988 | Grant et al. | 525/66 |
| 4,908,088 | 3/1990 | Boyd et al. | 156/307.3 |
| 4,977,215 | 12/1990 | Gardner et al. | 525/119 |
| 4,977,218 | 12/1990 | Gardner et al. | 525/329.3 |
| 4,999,238 | 3/1991 | Gawin | 523/400 |
| 5,003,018 | 3/1991 | Repecka | 526/262 |
| 5,089,560 | 2/1992 | Gardner et al. | 525/109 |
| 5,364,700 | 11/1994 | Domeier | 428/394 |

FOREIGN PATENT DOCUMENTS

| | | |
|---|---|---|
| 0252725 | 1/1988 | European Pat. Off. . |
| 0274899 | 7/1988 | European Pat. Off. . |
| 0351027 | 1/1990 | European Pat. Off. . |
| 0351028 | 1/1990 | European Pat. Off. . |
| 0441047 | 12/1990 | European Pat. Off. . |
| 2207139 | 1/1989 | United Kingdom . |

OTHER PUBLICATIONS

Bucknall and Partridge, *British Polymer Journal*, vol. 15, pp. 71–75 Mar. 1983.

Drake, et al., "Elastomer–Modified Epoxy Resins in Coating Applications," Epoxy Resin Chemistry II, Bauer Ed. ACS Symposium Series 221, pp. 1–20, 1983.

*Primary Examiner*—Edward J. Cain
*Attorney, Agent, or Firm*—Bernard Lau; Bart E. Lerman

[57] ABSTRACT

Bismaleimide resin systems and fiber reinforced prepregs prepared therefrom having exceptional toughness are prepared by dispersing into a bismaleimide base resin system preformed functionalized elastomer particles having a $T_g$ of less than 10° C.

20 Claims, No Drawings

BISMALEIMIDE RESIN SYSTEMS TOUGHENED BY ADDITION OF PREFORMED FUNCTIONALIZED LOW $T_G$ ELASTOMER PARTICLES

This application is a continuation of application Ser. No. 07/756,001 filed Sep. 6, 1991, now abandoned, which was a continuation-in-part of application Ser. No. 07/738,006, filed Jul. 30, 1991 now abandoned.

BACKGROUND OF THE INVENTION

1. Field of the Invention

The present invention pertains to the field of fiber-reinforced thermosetting composites. More particularly, the invention pertains to fiber-reinforced prepregs containing thermosetting bismaleimide resin systems containing particulate, functionalized elastomers having a $T_g$ of 10° C. and below, and the composites prepared therefrom.

2. Description of the Related Act

The use of fiber-reinforced thermoset composites continues to grow. While great strides have been made in increasing the strength, toughness, temperature use ceiling, and other important physical properties, improvement is still required. Although some resin systems, e.g. the bismaleimides, offer high use temperatures, epoxy resin systems remain the system of choice for many applications. Cyanate resin systems also are preferred for some applications.

However, all these resin systems are somewhat brittle, and thus easily subject to impact-induced damage. This lack of toughness has limited their use to non-critical applications, e.g. in sporting goods equipment and for non-load bearing applications in the transportation and aerospace industries. Many methods of increasing toughness of such resin systems have been investigated. As one result of such investigations, numerous new epoxy resin monomers have been introduced into the market. However despite initial promise, the use of these new and often higher cost epoxy monomers has not resulted in the increase in the toughness desired in composites. Bismaleimide resin systems are often copolymerized with unsaturated compounds such as diallylbisphenol A for the same reason.

What has become clear from the many investigations is that it is not possible, in general, to predict composite properties based on neat cured resin data, and as a result, air frame manufacturers insist that toughness be assessed on cured composite panels.

Other efforts to improve resin toughness has been the inclusion of soluble thermoplastics or elastomers into the resin system. For example, dissolution of polyethersulfone thermoplastics to epoxy resins was disclosed by Bucknall and Partridge in the *British Polymer Journal*, v. 15, March 1983 pages 71–75. The systems demonstrating the greatest toughness developed a multiphase morphology upon cure. U.S. Pat. No. 4,656,208 discloses a similar multiphase system wherein a reactive polyethersulfone oligomer and an aromatic diamine curing agent react to form complex multiphase domains. However, the systems of Bucknall have very high viscosities due to requiring excessive amounts of dissolved thermoplastic, and yet still do not meet the desired toughness standards. The systems of U.S. Pat. No. 4,656,208 are capable of preparing composites of good toughness, but are difficult to prepare and to process. In particular, the morphology is very cure-cycle dependent, and variations in the cure cycle may greatly affect the toughness of the cured composite.

The addition of soluble, reactive elastomers is known to increase toughness of epoxy resins, and has been used successfully in epoxy adhesives. However, the addition of soluble elastomers to epoxies for use in fiber-reinforced composites results in a decrease in modulus, strength, and use temperature.

The use of rigid particles to toughen epoxy resins is disclosed in European published application EP-A-O 274 899 where transparent infusible nylon particles when added to epoxy resins which when cured produce an interpenetrating network created an increase in composite toughness, and in European published application EP-A-252725 where fillers of glass and polyvinyl chloride were added to epoxy resin formulations, although the latter appeared to exhibit no increase in toughness as a result of such addition.

In European application EP-A-0 351 027 published Jan. 17, 1990 and in U.S. Pat. Nos. 4,977,218 and 4,977,215, the use of high $T_g$ particulate carboxylated crosslinked elastomers having shore hardness of greater than Shore D50 are said to increase toughness of epoxy resin-based composites. However, it is stated that the particles must remain rigid and perform, in addition to other functions, the function of maintaining ply separation. It is further stated that in order to perform this function, that softer elastomers, or those having a $T_g$ of less than 15° C. will not work. However, it is undesirable to increase interlaminar separation excessively, as this increased thickness of the interlaminar region requires a greater amount of matrix resin. As a result, the volume percent of fiber-reinforcement is decreased and the composite, while being tough, loses strength and modulus. Furthermore, it has been found that such particulate elastomers completely fail to increase toughness of brittle epoxy resin matrices.

U.S. Pat. No. 4,999,238 discloses a multiphase epoxy resin composition containing infusible particles which in turn contain carboxylfunctional elastomers. These compositions are prepared by polymerizing an epoxy resin, a diamine curing agent, e.g. diaminodiphenylsulfone, a reactive polyethersulfone oligomer, and a solution of an elastomer such as B. F. Goodrich Hycar® 1472. During cure, infusible particles of epoxy/hardener/oligomer/elastomer phase separate, these particles further containing domains of elastomer. However, such multiphasic systems are difficult and expensive to prepare and also difficult to process. Preparation involves multiple process steps which involve use of expensive, functionalized, soluble polyethersulfone oligomers which increase resin system viscosity undesirably. In addition, such systems are subject to unpredictable changes in morphology due to variations in resin processing, cure temperature, and cure cycle.

The same approaches to toughening epoxy resin matrices have also been attempted with other thermosetting resins, with some degree of success. It has been found, however, that often the methods successful in toughening epoxy resins fail with respect to bismaleimide or cyanate resins. An example is the use of particulate thermoplastic polyimide 2080 available from Lenzing AG and Matrimide 5218 thermoplastic polyimide available from Ciba-Geigy. The former was ineffective in toughening epoxy resin matrices but very effective in bismaleimides, while the latter was highly effective in epoxy resins but much less effective in bismaleimides. Therefore, it would be desirable to discover a method of toughening which is to some degree formulation independent.

SUMMARY OF THE INVENTION

It has now been surprisingly discovered that thermosetting bismaleimide fiber-reinforced composites may be toughened against impact induced damage by incorporation of a most minor amount of preformed functionalized elastomer particles having a $T_g$ of less then 10° C. and a particle size from 2 μm to 70 μm into the uncured matrix resin system of the fiber-reinforced prepregs used to prepare such composites. Preferably the base resin system (less the functionalized elastomer) is capable of producing a composite having a compression strength after impact (CAI) of 22 Ksi or more.

DESCRIPTION OF THE PREFERRED EMBODIMENTS

The base resin systems useful in the subject invention are derived from bismaleimide resins. By the term "bismaleimide" as used herein is also meant the closely related nadicimides. Preferred bismaleimides are the bismaleimides and nadicimides of toluenediamine, aliphatic amines, methylenedianiline, aliphatic diamines, isophorone diamine, and the like. Further examples of suitable bismaleimides are disclosed in U.S. Pat. Nos. 4,644,039 and 5,003,018 which are herein incorporated by reference. Generally, the bismaleimides are copolymerized with an alkenylphenol comonomer such as o,o'-diallylbisphenol A, o,o'-diisopropenylbisphenol A, allyleugenol, etc. When bismaleimides are the major thermosetting resin it is frequently desirable to add a low viscosity epoxy resin, for example a bisphenol F epoxy or resorcinol based epoxy to the resin system in minor amount. Further suitable low viscosity epoxy resins are disclosed on pages 14–16 of copending U.S. application Ser. No. 07/413,429 which is herein incorporated by reference.

The cyanate resins are also well known, and may be prepared by reacting a cyanogen halide, preferably cyanogen bromide, with a phenol to form the corresponding cyanate ester. Suitable cyanates are those prepared from resorcinol, the bisphenols, particularly bisphenol A and bisphenol F, the phenolated dicyclopentadienes, dihydroxynaphthalenes, and dihydroxybiphenyls. The cyanate resins may be used in conjunction with bismaleimide resins.

It is preferred that the resin system chosen have a base resin CAI of greater than 22 Ksi. By this it is meant that the base resin, less low $T_g$ functionalized elastomer particles, and not including particulate thermoplastic tougheners, when used to impregnate intermediate modulus unidirectional carbon fibers such as Hercules IM-7 or Celion G-500 fibers, and then consolidated into a quasiisotropic panel in accordance with Boeing Support Specification BSS 7260 will have a compression strength after 1500 inch-lb/in impact of 22 Ksi or more. Although this test of neat resin toughness is measured on intermediate modulus fibers, it should be emphasized that the resin systems, having met this test, may be utilized with any reinforcing fibers including but not limited to high and low modulus as well as intermediate modulus carbon fibers.

The particulate modifiers employed in the practice of this invention may be characterized as comprising preformed, functionalized, low $T_g$ particles, and more particularly as being a finely-divided, functionalized, partially cross-linked rubber. Particles formed of carboxylated and amino and anhydride functionalized rubbers exhibit particularly good adhesion to the matrix resin, possibly by becoming chemically bound to the matrix resin or simply by having an improved affinity for the matrix resin due to the presence of polar groups at the particle surface.

The particles are further characterized as being partially crosslinked, meaning that the rubber particles will exhibit sufficient integrity to resist being solubilized appreciably at temperatures that will normally be encountered during the fabricating and curing of the laminate. Such rubber particles will be dispersed in the matrix resin without dissolving or otherwise losing their particulate character. Rubbers having glass transition temperatures below 10° C., preferably below 0° C. are suitable.

Suitable functionalized rubbers include conventional diene and olefin rubbers having, or modified to include, from about 0.1 to about 5 wt %, preferably from about 0.5 to about 3 wt % carboxyl, carboxamide, anhydride, epoxy, or amine functionality. The particular functional groups should be capable of reacting with at least one of the resin system monomers. Representative of such diene rubbers are the variety of well known rigid, possibly cross-linked copolymers of butadiene or isoprene including for example the dieneacrylonitrile copolymers widely available as nitrile rubbers, copolymers of vinyl aromatic monomers and diene monomers such as the styrene-butadiene copolymers known as SBR rubbers, and terpolymers of dienes with acrylonitrile and styrene or vinyl toluene, all of which, when modified with the desired level of functionality, may be described as functionalized diene rubbers. Many such rubbers having $T_g$ values below 10° C. and preferably below 0° C. and the desired functionality are readily available from commercial sources. Also useful are rubbery copolymers of acrylate esters with carboxyl functionality, which may be described as carboxylated acrylic rubbers. Acrylic rubbers with the desired level of carboxylic functionality and having $T_g$ values in the range of −25° C. to 10° C. are also commercially available in a variety of forms. Other polymers which may be similarly modified to include carboxyl or other functionality include rubbery copolymers and particularly graft copolymers of styrene, vinyltoluene or the like and optionally one or more additional copolymerizable vinyl monomers on a rubbery polymeric substrate, using a sufficiently high level, preferably greater than 60 wt %, of the rubbery substrate component. Specific examples include rubbery acrylonitrile-butadiene-styrene (ABS) polymers, methylmethacrylate-butadiene-acrylonitrile-styrene (MABS) polymers and the like.

Modification of rubbers to include carboxyl functionality may be accomplished by a variety of well known processes, including copolymerizing the rubber monomers with a suitable copolymerizable carboxylic monomer or by grafting the preformed rubber in solution, suspension, or latex form, with carboxylic compounds such as maleic anhydride, maleimide, acrylic acid, itaconic acid or the like. Other methods for providing carboxylated rubbery polymers having the necessary character include grafting the polymers in particle form with mixtures of a monomer and a copolymerizable carboxylic or other functional unsaturated compound to provide particles having a relatively rigid outer shell with reactive carboxylic or other functionality, and many such core-shell particulate modifiers are also known and commercially available. Also suitable are post reaction processes for functionalizing rubbery diene copolymers, olefin rubbers and the like, as recently described in U.S. Pat. Nos. 4,740,552 and 4,654,405.

The functionalized rubbers suitable for use as rubber particles according to the practice of this invention may thus be described as functionalized rubbers having a $T_g$ less than 10° C. which may be selected from the group of functionalized diene rubbers, functionalized acrylic rubbers, and mixtures thereof.

The functionalized rubber particles may be solid, porous or hollow and take any convenient shape, and may for example be formed into bead-like spheres or oblate spheroids from solutions, dispersions or suspensions of the rubber by a variety of processes including spray drying, flash evaporation, precipitation, coagulation or the like. The particles may also be produced from bulk material by a pulverizing or grinding process, optionally under cryogenic conditions, to provide particles rough and irregular in shape. Suitable particles may also be formed by coating a functionalized rubber onto a particulate support having the appropriate size then partially cross-linking the carboxylated rubber coating. For example, SAN and polyolefin resins, as well as SBR, nitrile rubber and the like are available as particles in the form of a latex, suspension or dispersion. Such particles may be coated individually with a functionalized rubber together with appropriate curing additives, cured to form a cross-linked coating on the individual particles, then collected in particle form by a spray-drying operation or the like.

Amino-functionalized elastomers may be prepared by known methods, and are disclosed, in the article "Elastomer-Modified Epoxy Resins in Coatings Applications" by R. S Drake, et. al., *Epoxy Resin Chemistry II*, Bauer, Ed., ACS Symposium Series 221, ©1983, pp 1–20. Anhydride functional elastomers are also useful. These may be prepared, for example, by including maleic anhydride in the mixture of monomers used to prepare the elastomers.

The particle size of the functionalized elastomers should be in the range of 2 µm to 70 µm, preferably 5 µm to 50 µm. The weight percentage of functionalized elastomer in the resin system is most minor, generally being less than 10 percent by weight. Amounts of from 3 weight percent to 8 weight percent have been found to be particularly useful.

In mixing the resin system ingredients and particulate elastomer, care should be taken to assure that the low $T_g$ preformed functionalized elastomer particles remain in particulate form, i.e. no appreciable solution into the resin system components takes place. This can ordinarily be achieved under normal resin mix conditions, although with some elastomers, the mixing temperature or time may have to be lowered. Such modifications to normal mix conditions are within the level of skill in the art. Light crosslinking of the rubber particles facilitates this requirement.

The single phase systems of the subject invention may further contain a particulate engineering thermoplastic. Such thermoplastics have high strength and glass transition temperatures above 150° C., preferably above 200° C. The particulate thermoplastic or mixture may be a polyimide, polyetherimide, polyethersulfone, polyetherketone, or the like. The amount of such thermoplastic is preferably adjusted to an amount which fails to cause phase separation in the cured matrix resin. Suitable amounts are from 5 to about 30 percent by weight. Preferably, the thermoplastic particles may be described as differentially soluble. Such thermoplastics have a relatively steep rate of solution versus temperature, and may easily be maintained in particulate form during resin mixing and prepregging, but dissolve rapidly upon cure to produce a single phase cured thermosetting resin having a gradient of increasing thermoplastic content which reaches a maximum in the interply region. A thermoplastic may be tested for its differential solubility by simple tests, for example by mixing the requisite amount of thermoplastic particles with the remaining system components at the mix temperature, followed by heating to the cure temperature for a short time while stirring. At the mix temperature, the greatest amount of thermoplastic particles should not dissolve, but remain in particulate form, while at the cure temperature, the greatest portion should dissolve and any remaining thermoplastic should at least swell, indicating partial solubility.

With some matrix resins, differential solubility is not required, but in such cases it is desirable that the particulate thermoplastic at least swell in the resin system components, indicating at least some solubility. In the absence of such behavior, for example with rigid insoluble thermoplastics such as PEEK and polyvinylchloride, lack of adherence to the matrix resin may cause increased delamination after impact.

Soluble thermoplastics may also be utilized. Such thermoplastics are generally added in relatively minor amounts, for example from 5 to about 15 percent by weight. Higher amounts of dissolved thermoplastic generally leads to undesirable increases in the uncured resin viscosity, which may partially be compensated by use of base resin system components, i.e. the epoxy, bismaleimide, or cyanate monomers, with lower viscosity. Addition of lower amounts of dissolved thermoplastic, i.e. from 5 to 15 percent by weight, will often assist the toughness of the system. Further, when lower amounts of dispersed particulate thermoplastic is utilized, the addition of dissolved thermoplastic can sometimes alter the solvent character of the matrix in such a manner that particulate thermoplastics which are normally too soluble, may in the presence of the dissolved thermoplastic, exhibit the desirable differential solubility alluded to earlier.

The preformed, low $T_g$, functionalized elastomers are generally added at temperatures between 50° C. and 150° C., for example at about 100° C. The elastomers are normally added prior to addition of curing agent when used with epoxy resins, in order to avoid premature advancement of the resin. If particulate thermoplastics are utilized, they may be added at this time also. However, when dissolved thermoplastics are utilized, they are normally added prior to addition of the elastomer. In some cases it may also prove to be advantageous to prereact the elastomeric particles with the matrix resin at elevated temperatures for an extended period of time, for example 30–150 minutes at 100° C.–150° C. The chemical reaction between the functional groups of the elastomer and the matrix resin can optionally be accelerated by the use of a suitable catalyst. It should be noted, however, that the particulate elastomer must not dissolve under these conditions, but must remain in particulate form. Such prereaction is believed to assist in promoting adherence of the low $T_g$ rubber particles to the resin matrix.

The toughened matrix resin systems of the subject invention may be utilized as neat films in structural adhesives, or may be scrim supported for these applications. In the case where use as matrix resins for fiber-reinforced prepregs is contemplated, the fiber reinforcement may be in the form of a random nonwoven mat, a woven textile, or unidirectional tows or tape. The fibers utilized may be high melting organic fibers or inorganic fibers.

Examples of high melting organic fibers are the high temperature polyolefin (e.g. those sold under the tradename SPECTRA® fibers), polyetherketone (PEK) and similar fibers, for example those sold by BASF A. G. under the tradename ULTRAPEK® polyetherketone; all aromatic polyamides, or aramid fibers; and the like. Preferably, however, inorganic fibers such as glass quartz, carbon (and graphitic modifications), silicon carbide, boron nitride, ceramic, and the like are utilized. The toughened matrix resins of the subject invention demonstrate their toughness best when utilized with carbon fibers, for example the intermediate modulus carbon fibers sold under the tradename CELION® by BASF Structural Materials, and Hercules IM-7 fibers.

Curing of the adhesives and prepregs of the subject invention utilize conventional cure temperatures and cure cycles. Bismaleimide systems are generally cured under modest autoclave pressure at 350° F. (177° C.), for example. In the Examples which follow, the various low $T_g$ functionalized elastomers were visually observed to have a particle size distribution such that the smallest particles ranged from 1–2 μm in size, the largest particles 50–70 μm in size, and the greatest portion of particles based on weight percent were between 10 and 20 μm.

The invention may be illustrated by the following examples.

EXAMPLE 1—COMPARATIVE

A bismaleimide resin system was prepared by dissolving 54 parts by weight of the bismaleimide of 4,4'-diaminodiphenylmethane into approximately 40 parts by weight of 2,2'-diallylbisphenol A at 138° C. After the mixture had cooled, 0.3 parts by weight of triphenylphosphine dissolved in 2,2'-diallylbisphenol A was added. The total amount of 2,2'-diallylbisphenol A comonomer in the composition was 46 parts by weight. Prepregs were prepared from the resin system utilizing Hercules IM 7 intermediate modulus carbon fibers. These prepregs were subsequently laid up in a quasi-isotropic panel having a nominal resin content of 35 weight percent tested for compression strength after impact (CAI) according to Boeing support specification 7260 at an impact level of 1500 in-lb/in. The panel exhibited a CAI of 22.6 ksi.

EXAMPLE 2

To the resin system of comparative Example 1 was added 5 weight percent of NIPOL® 5045, a 1:1 acrylonitrile/butadiene elastomer containing less than 1 weight percent acrylic acid and less than 1 weight percent acrylate ester, and having a $T_g$ of −8° C. Prepregs prepared as in Example 1 and laid up into quasiisotropic panels exhibited a CAI of 34.2 ksi, a 51 percent improvement over the system of Comparative Example 1.

EXAMPLE 3—COMPARATIVE

Into a resin kettle was introduced 268 grams of o,o'-diallylbisphenol A comonomer at room temperature. Mixing was commenced with an ULTRA-TURRAX® 600 watt mixer as a result of which the temperature of the comonomer rose to above 38° C. Next, 713 grams of a eutectic mixture of bismaleimides containing approximately 64 weight percent, 15 weight percent, and 21 weight percent respectively of the bismaleimides of methylenedianiline, trimethylhexamethylene diamine, and toluene diamine was added using external cooling, when necessary, to keep the temperature below 93° C. Prior to addition, the bismaleimide had been coarsely crushed and sieved to a particle size of less than about 3 mm. After the addition of bismaleimide was completed, an additional 20 grams of diallylbisphenol A containing 5 weight percent of curing catalyst was added at a temperature below 82° C. The finished resin system was coated onto silicone coated release paper and used to prepare a carbon/graphite prepreg as in Example 1. Microscopic examination revealed no large crystals of bismaleimide, but disclosed instead a uniform dispersion of particles having a size below about 20 μm. The prepregs thus prepared, when laid up into quasiisotropic panels and tested as in Example 1 exhibited a CAI of 28.2 ksi.

EXAMPLE 4

To the slurry mixed resin system of Comparative Example 3 was added 5 weight percent of NIPOL 5045. Panels prepared from prepregs prepared from this resin system exhibited a CAI of 33.7 ksi, an increase of 19 percent over Comparative Example 3.

We claim:

1. A toughened thermosetting bismaleimide resin system, comprising:
    A. A base resin system comprising
        (i) one or more bismaleimide functional monomers;
        (ii) a comonomer which is an alkenylphenol; and
        (iii) optionally, a dissolved thermoplastic having a $T_g$ greater than 150° C.;
    B. from about 1 percent to about 10 percent by weight relative to the total system weight of a functionalized, lightly crosslinked elastomer having a $T_g$ of less than 10° C., and a particle size of from about 2 μm to about 70 μm; and
    C. optionally, particulate engineering thermoplastics in an amount of from 10 to 30 weight percent based on the total resin system weight.

2. The resin system of claim 1 wherein said functionalized elastomer has a $T_g$ of less than 0° C.

3. The resin system of claim 1 wherein said functionalized elastomer contains carboxyl, carboxamide, epoxy amine, or anhydride functionality.

4. The resin system of claim 2 wherein said functionalized elastomer contains carboxyl, carboxamide, epoxy, amine, or anhydride functionality.

5. The resin system of claim 1, further comprising:
    D. a low viscosity epoxy resin.

6. The resin system of claim 5 wherein the resin system contains from about 5 weight percent to about 15 weight percent of a dissolved thermoplastic.

7. The resin system of claim 4 wherein the resin system contains from about 5 weight percent to about 15 weight percent of a dissolved thermoplastic.

8. The resin system of claim 6 wherein said resin system contains from about 5 weight percent to about 30 weight percent of a particulate thermoplastic.

9. The resin system of claim 1 wherein said particulate thermoplastic B is a differentially soluble thermoplastic.

10. The resin system of claim 5 wherein said particulate thermoplastic B is a differentially soluble thermoplastic.

11. A fiber reinforced thermosettable prepreg comprising
    (a) from 20 to about 80 weight percent of fibrous reinforcement; and
    (b) from 80 to about 20 weight percent of the resin system of claim 1.

12. A fiber reinforced thermosettable prepreg comprising
    (a) from 20 to about 80 weight percent of fibrous reinforcement; and
    (b) from 80 to about 20 weight percent of the resin system of claim 2.

13. A fiber reinforced thermosettable prepreg comprising
    (a) from 20 to about 80 weight percent of fibrous reinforcement; and
    (b) from 80 to about 20 weight percent of the resin system of claim 3.

14. A fiber reinforced thermosettable prepreg comprising
    (a) from 20 to about 80 weight percent of fibrous reinforcement; and
    (b) from 80 to about 20 weight percent of the resin system of claim 4.

15. A fiber reinforced thermosettable prepreg comprising
    (a) from 20 to about 80 weight percent of fibrous reinforcement; and
    (b) from 80 to about 20 weight percent of the resin system of claim 5.

16. A fiber reinforced thermosettable prepreg comprising
(a) from 20 to about 80 weight percent of fibrous reinforcement; and
(b) from 80 to about 20 weight percent of the resin system of claim 6.

17. A fiber reinforced thermosettable prepreg comprising
(a) from 20 to about 80 weight percent of fibrous reinforcement; and
(b) from 80 to about 20 weight percent of the resin system of claim 7.

18. A fiber reinforced thermosettable prepreg comprising
(a) from 20 to about 80 weight percent of fibrous reinforcement; and
(b) from 80 to about 20 weight percent of the resin system of claim 8.

19. A fiber reinforced thermosettable prepreg comprising
(a) from 20 to about 80 weight percent of fibrous reinforcement; and
(b) from 80 to about 20 weight percent of the resin system of claim 9.

20. A fiber reinforced thermosettable prepreg comprising
(a) from 20 to about 80 weight percent of fibrous reinforcement; and
(b) from 80 to about 20 weight percent of the resin system of claim 10.

* * * * *